UNITED STATES PATENT OFFICE.

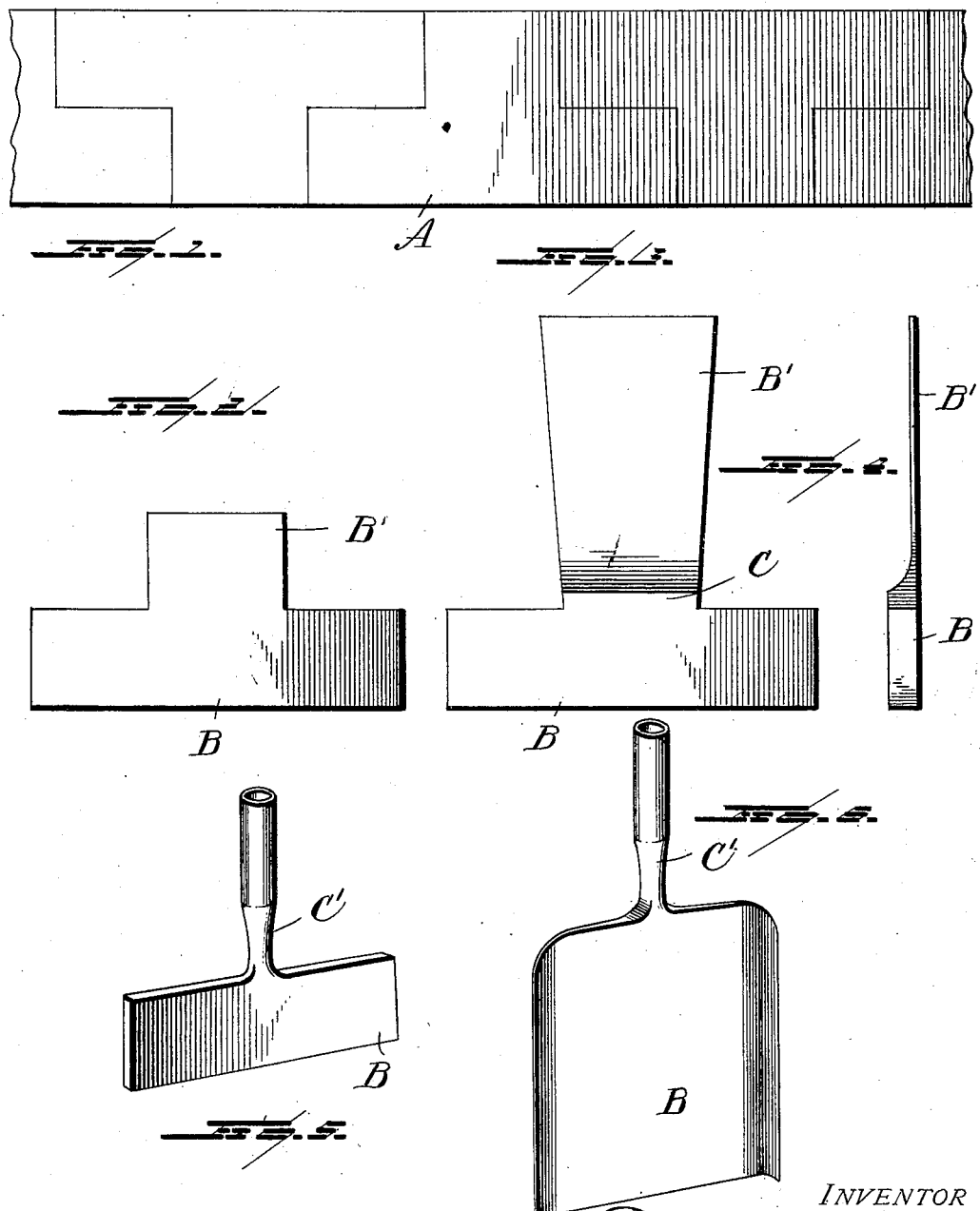

FREDERICK SKELTON, OF MARTINS FERRY, OHIO.

METHOD OF MAKING SHOVELS, HOES, &c.

SPECIFICATION forming part of Letters Patent No. 685,183, dated October 22, 1901.

Application filed July 1, 1901. Serial No. 66,740. (No model.)

*To all whom it may concern:*

Be it known that I, FREDERICK SKELTON, a citizen of the United States, residing at Martins Ferry, in the county of Belmont and State of Ohio, have invented certain new and useful Improvements in Processes of Making Shovels, Hoes, &c.; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in the process of making shovels, hoes, ditching-tools, &c.; and it consists in first cutting the blanks from a piece of steel, forming a fang, which is rolled or plated out and formed into a solid socket portion, while the intervening portion of the metal between the socket and blade of the tool is reduced by swaging to a suitable size, and afterward rolling out the blade to the proper gage. By my process I am able to reinforce portions of the tool where the most strain and wear comes, and I am able to leave stock on the shoulders of spades and ditching-tools by which a solid tread may be formed in place of the usual tread or cap which is fastened to the spade.

The invention will be hereinafter more fully described in detail, and then defined in the appended claims and illustrated in the accompanying drawings, which, with the letters of reference marked thereon, form a part of this application, and in which drawings—

Figure 1 is a perspective view of a block of metal, showing the blanks outlined preparatory to their being cut from the block. Fig. 2 represents one of the blanks as cut from the block. Fig. 3 is a view of the blank, which shows its fang as rolled preparatory to its being formed into a socket. Fig. 4 is a side elevation of the form shown in Fig. 3. Fig. 5 is a detail view of the blank with the flattened fang and shank rolled or formed. Fig. 6 is a view of the completed shovel.

Reference now being had to the details of the drawings by letter, A designates a bar of steel, from which the blanks B are cut in any suitable manner. These blanks each have a fang B', which when rolled and swaged forms the socket portion of the shovel. In carrying out my process in making the shovels or other tools I subject a portion of the fang to an apparatus which plates or rolls out the flattened portion, (illustrated in Fig. 4,) leaving a shouldered part C. This flattened portion is afterward subjected to a suitable apparatus for swaging and turning the same into the socket illustrated. The shouldered part C is compressed and drawn out, forming the solid tapering shank portion C' adjacent to the blade of the shovel. The socket portion having been formed in the manner described, the laterally-projecting portions at the end of said shank portion are plated or rolled out to form the blade of the shovel or or other tool.

By this process I am able to form a solid socket portion without slitting or punching or welding the fang, and I am able to reinforce portions of the tool where the most strain and wear comes and to leave the stock on the shoulders of spades, ditching-tools, &c., and form a solid tread in place of the usual cap which is fastened to the spade.

Having thus described my invention, what I claim to be new, and desire to secure by Letters Patent, is—

1. The method of making shovels, hoes, &c., consisting of rolling out into a thin sheet a right-angled fang of a blank of metal without twisting the fang, and turning the opposite longitudinal edges to meet each other without overlapping or welding same, thus forming a cylindrical socket, and afterward plating out the blank to form a shovel-blade, as set forth.

2. The method of making shovels, hoes, &c., consisting of rolling out into a thin sheet a wide right-angled fang of a blank of metal, without twisting the fang, and turning the opposite longitudinal edges of the rolled sheet to meet without overlapping each other, a portion of said fang not being rolled and swaged to form a shank for the shovel, the rest of the blank afterward being rolled or plated to form the shovel-blade.

In testimony whereof I hereunto affix my signature in presence of two witnesses.

FREDERICK SKELTON.

Witnesses:
 MABEL RYAN,
 CHARLES L. RYAN.